United States Patent
Pan et al.

(10) Patent No.: US 10,436,931 B2
(45) Date of Patent: Oct. 8, 2019

(54) ELECTROMAGNETIC SENSOR FOR A DOWNHOLE DIELECTRIC TOOL

(71) Applicant: Halliburton Energy Services, Inc, Houston, TX (US)

(72) Inventors: Li Pan, Singapore (SG); Chao-Fu Wang, Singapore (SG); Rencheng Song, Singapore (SG); Jin Ma, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 181 days.

(21) Appl. No.: 15/506,048

(22) PCT Filed: Nov. 5, 2014

(86) PCT No.: PCT/US2014/064013
§ 371 (c)(1),
(2) Date: Feb. 23, 2017

(87) PCT Pub. No.: WO2016/072979
PCT Pub. Date: May 12, 2016

(65) Prior Publication Data
US 2017/0307776 A1   Oct. 26, 2017

(51) Int. Cl.
*G01V 3/30*   (2006.01)
*G01V 3/38*   (2006.01)

(52) U.S. Cl.
CPC . *G01V 3/30* (2013.01); *G01V 3/38* (2013.01)

(58) Field of Classification Search
None
See application file for complete search history.

(56) References Cited

U.S. PATENT DOCUMENTS

| | | | |
|---|---|---|---|
| 3,412,815 A | 11/1968 | Holser et al. | |
| 4,489,276 A | 12/1984 | Yu | |
| 4,502,662 A | 3/1985 | Maldavs et al. | |
| 4,511,842 A * | 4/1985 | Moran | G01V 3/30 324/338 |
| 4,704,581 A | 11/1987 | Clark | |

(Continued)

OTHER PUBLICATIONS

Bittar, et al., "A Modern Microwave Formation Evaluation Sensor and Its Applications in Reservoir Evaluation," *Society of Petrophysicists and Well-Log Analysts*, SPWLA 51st Annual Logging Symposium, Jun. 19-23, 2010, Perth, Australia.

(Continued)

*Primary Examiner* — Paresh Patel
(74) *Attorney, Agent, or Firm* — Haynes and Boone, LLP

(57) ABSTRACT

Electromagnetic sensors which provide high coupling gain between the transmitter and receiver of a dielectric tool include a conductive pad having a cavity filled with dielectric filler, and an electrical conductor that provides electrical current to a conductive feeder placed inside the dielectric filler. During operation, current is fed to the conductive feeder to thereby produce an electric monopole that feeds electromagnetic power into the cavity, which then radiates out into the formation as electromagnetic signals. Because of the design of the electromagnetic sensors, the transmitter/receiver coupling gain and SNR are optimized over the entire range of the dielectric constant (i.e., $5 \leq \epsilon_r \leq 80$).

19 Claims, 6 Drawing Sheets

(56) References Cited

U.S. PATENT DOCUMENTS

| | | | |
|---|---|---|---|
| 5,039,992 | A | 8/1991 | Lenormand et al. |
| 5,434,507 | A | 7/1995 | Beren et al. |
| 7,250,768 | B2 | 7/2007 | Ritter et al. |
| 7,441,463 | B2 | 10/2008 | Fallah-Rad et al. |
| 7,660,671 | B2 | 2/2010 | Taherian et al. |
| 7,753,119 | B2 | 7/2010 | Chen et al. |
| 8,575,936 | B2 | 11/2013 | Bloys et al. |
| 2004/0245991 | A1 | 12/2004 | Hayman et al. |
| 2011/0221443 | A1 | 9/2011 | Bittar et al. |
| 2013/0027043 | A1 | 1/2013 | Li et al. |
| 2014/0019049 | A1 | 1/2014 | Dorovsky |

OTHER PUBLICATIONS

International Search Report and the Written Opinion of the International Search Authority, or the Declaration, Aug. 4, 2015, PCT/US2014/064013, 14 pages, ISA/KR.

Rau, et al., "Advances in High Frequency Dielectric Logging," *Society of Petrophysicists and Well-Log Analysts*, SPWLA 32nd Annual Logging Symposium, Jun. 16-19, 1991, Midland, Texas.

\* cited by examiner

| Material | ε' | t pl (ns / m) |
|---|---|---|
| Sandstone | 4.65 | 7.2 |
| Dolomite | 6.8 | 8.7 |
| Limestone | 7.5-9.2 | 9.1-10.2 |
| Anhydrite | 6.35 | 8.4 |
| Dry colloids | 5.76 | 8.0 |
| Halite | 5.6-6.35 | 7.9-8.4 |
| Gypsum | 4.16 | 6.8 |
| Petroleum | 2.0-2.4 | 4.7-5.2 |
| Shale | 5-25 | 7.45-16.6 |
| Fresh water at 25°C and below $10^{10}$ Hz | 78.3 | 29.5 |

ELECTROMAGNETIC SENSOR FOR A DOWNHOLE DIELECTRIC TOOL

PRIORITY

The present application is a U.S. National Stage patent application of International Patent Application No. PCT/US2014/064013, filed on Nov. 5, 2014, the benefit of which is claimed and the disclosure of which is incorporated herein by reference in its entirety.

FIELD OF THE DISCLOSURE

The present disclosure generally relates to downhole sensors and, more particularly, to electromagnetic sensors that provide high coupling gain over the whole range of the dielectric constant.

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging, "logging while drilling" ("LWD"), drill-pipe conveyed logging, and coil tubing conveyed logging.

One example of a logging tool is a wireline dielectric tool. Dielectric tools determine the dielectric constant and conductivity of downhole formations from the real and imaginary parts of the complex propagation constant of electromagnetic waves traveling through the formations. By measuring the phase difference and amplitude ratio between two points in the formation, the tool determines the formation resistivity and dielectric constant. These measurements are useful for finding water-filled porosity, and water saturation can be computed if formation porosity is known. If multiple water saturation measurements are available (e.g., from different types of logging tools), it becomes possible to measure characteristics of the flushed zone.

Dielectric tools utilize sensors to evaluate the dielectric constant of the formation ($5 \leq \epsilon_r \leq 80$). In order to obtain a good signal-noise-ratio ("SNR"), a high gain of coupling from transmitter to receiver is desirable. In practice, however, it is very difficult to achieve high coupling gain over the whole range of the dielectric constant of the formation. During operation, a dielectric sensor usually works well over a narrow range of the dielectric constant, because the matching between formation and sensor is good within the range. Nevertheless, the sensor's performance significantly deteriorates as a result of the out-of-range variation of the dielectric constant of formation, which worsens the matching. As an example, conventional high frequency dielectric tools exhibit good coupling gain and SNR for those dielectric constants between $30 \leq \epsilon_r \leq 50$, but its performance significantly deteriorates once the dielectric constant is outside of this range (i.e., $5 \leq \epsilon_r \leq 30$ & $50 \leq \epsilon_r \leq 80$).

Therefore, there is a need in the art to provide improved dielectric sensors which provide high coupling gain over the entire range of the dielectric constant.

DESCRIPTION OF ILLUSTRATIVE EMBODIMENTS

Illustrative embodiments and related methods of the present disclosure are described below as they might be employed in electromagnetic sensors for improving the performance of dielectric tools over the entire range of the dielectric constant. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, embodiments and related methods of the present disclosure are directed to electromagnetic sensors which provide high coupling gain between the transmitter and receiver of a dielectric tool. In a generalized embodiment, the electromagnetic sensors (transmitter and receiver) include a conductive pad having a cavity filled with dielectric filler. An electrical conductor provides electrical current to a conductive feeder placed inside the dielectric filler. In certain embodiments, the conductive feeder includes a metal frustum and a loading cylinder. During operation, current is fed to the conductive feeder to thereby produce an electric monopole that feeds electromagnetic power into the cavity, which then radiates out into the formation as electromagnetic signals. Because of the design of the electromagnetic sensors, the transmitter/receiver coupling gain and SNR are optimized over the whole range of the dielectric constant (i.e., $5 \leq \epsilon_r \leq 80$).

Figure 1:
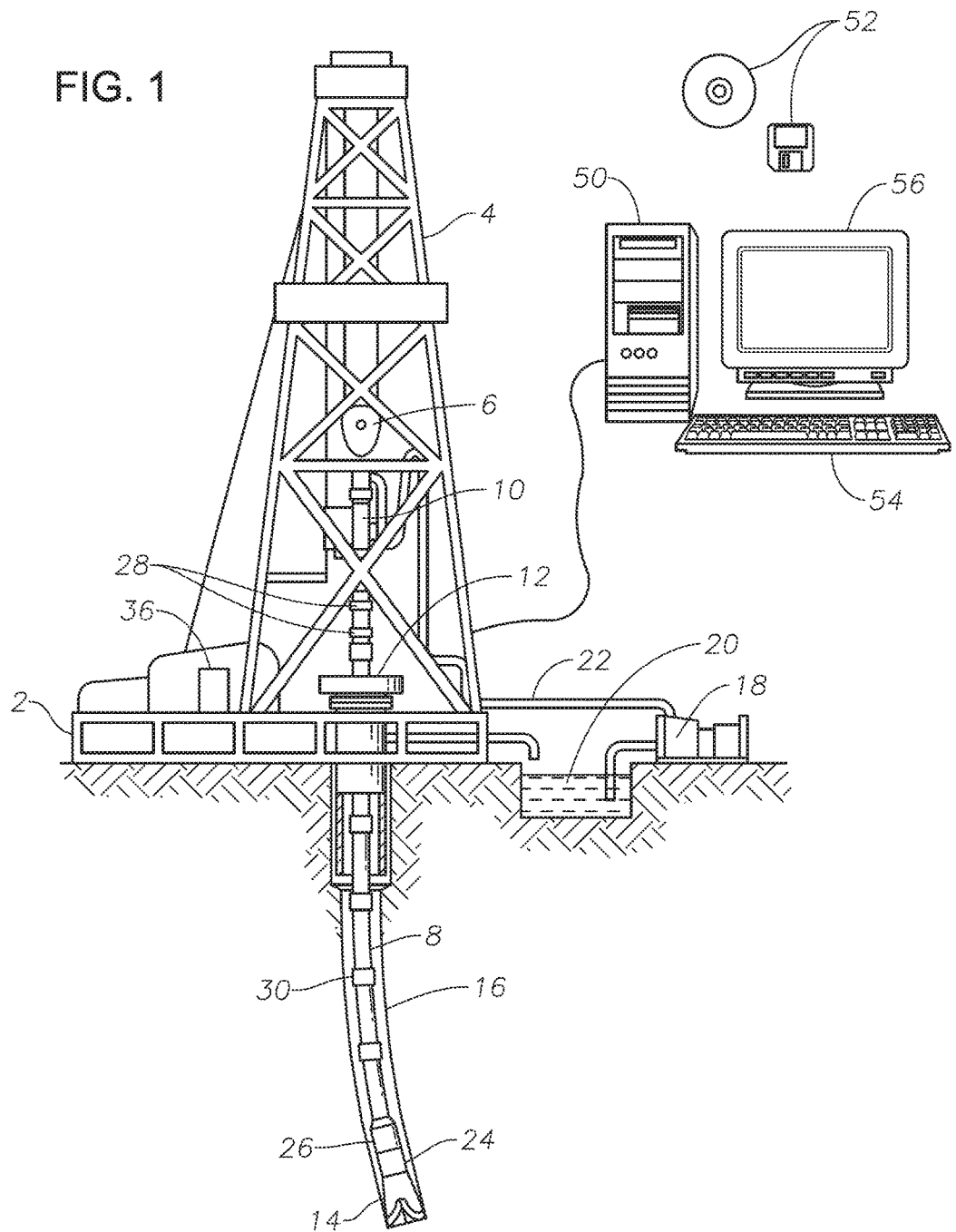
FIG. 1 shows an illustrative LWD environment in which a dielectric logging tool is deployed, according to an illustrative embodiment of the present disclosure.

The disclosed electromagnetic sensors and related methods are best understood in the context of larger systems in which they may operate. Accordingly, FIG. 1 shows an illustrative logging-while-drilling ("LWD") environment in which a dielectric logging tool is deployed. A drilling platform 2 supports a derrick 4 having a traveling block 6 for raising and lowering a drill string 8. A top drive 10 supports and rotates drill string 8 as it is lowered through wellhead 12. A drill bit 14 is driven by a downhole motor and/or rotation of drill string 8. As bit 14 rotates, it creates a borehole 16 that passes through various formations. A pump 18 circulates drilling fluid 20 through a feed pipe 22, through the interior of drill string 8 to drill bit 14. The fluid exits through orifices in drill bit 14 and flows upward through the annulus around drill string 8 to transport drill cuttings to the surface, where the fluid is filtered and recirculated.

Drill bit 14 is just one piece of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

An LWD dielectric logging tool 24 is integrated into the bottom-hole assembly near bit 14. In this illustrative embodiment, logging tool 24 may be, for example, a LOGIQ® High Frequency Dielectric Tool, commercially available through Halliburton Energy Services, Inc. of Houston, Tex. As bit 14 extends the borehole through the formations, dielectric logging tool 24 rotates and collects azimuthally-dependent reflection measurements that a downhole controller associates with tool position and orientation measurements. The measurements can be stored in internal memory and/or communicated to the surface. A telemetry sub 26 may be included in the bottom-hole assembly to maintain a communications link with the surface. Mud pulse telemetry is one common telemetry technique for transferring tool measurements to surface receivers and receiving commands from the surface, but other telemetry techniques can also be used.

At the surface, a data acquisition module 36 receives the uplink signal from the telemetry sub 26. Module 36 optionally provides some preliminary processing and digitizes the signal. A data processing system 50 (shown in FIG. 1 as a computer) receives a digital telemetry signal, demodulates the signal, and displays the tool data or well logs to a user. Software (represented in FIG. 1 as information storage media 52) governs the operation of system 50. A user interacts with system 50 and its software 52 via one or more input devices 54 and one or more output devices 56.

Figure 2:
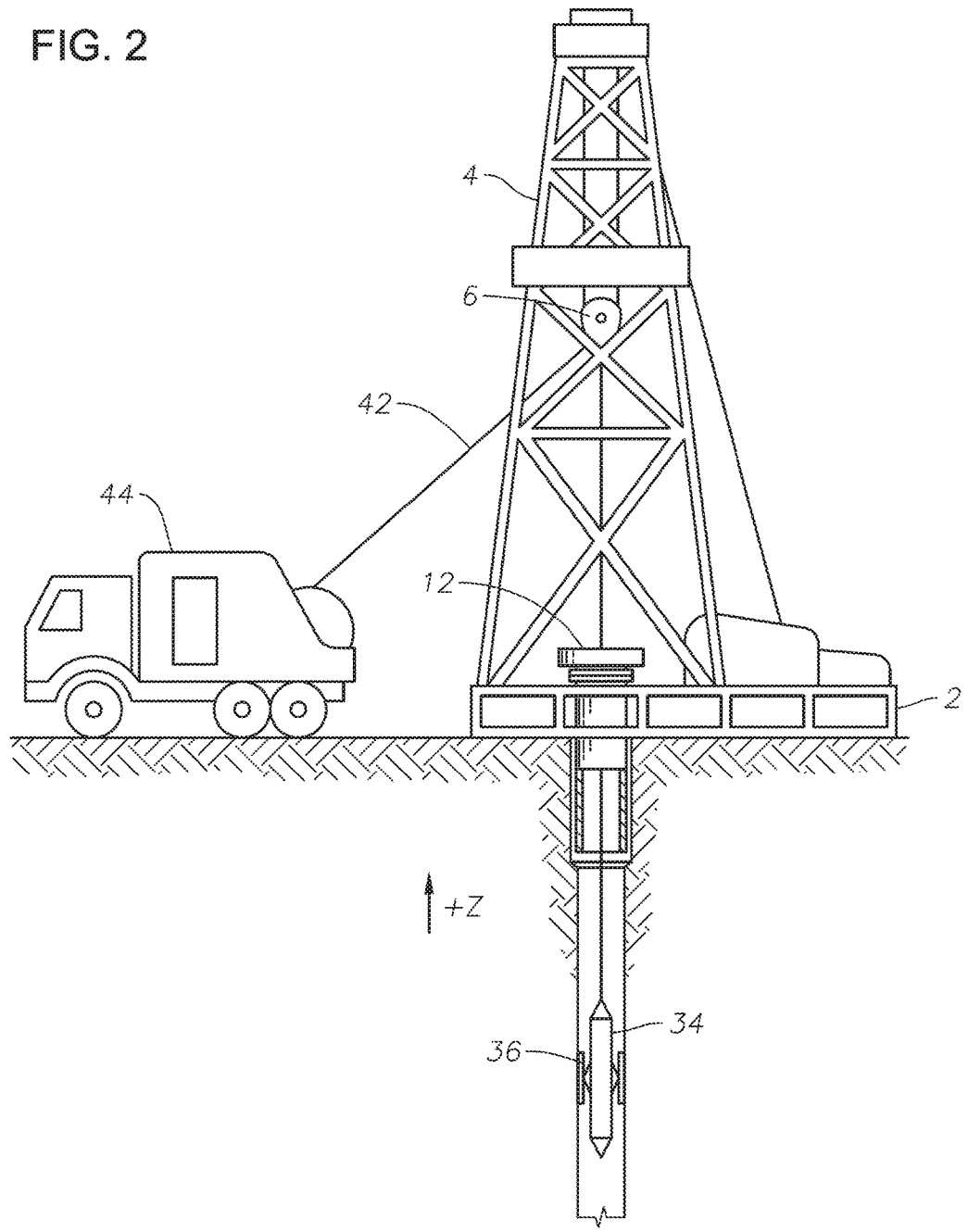
FIG. 2 shows an embodiment of the present disclosure deployed in a wireline application.

At various times during the drilling process, drill string 8 may be removed from the borehole as indicated in FIG. 2, which shows an embodiment of the present disclosure deployed in a wireline application. In such an embodiment, once drill string 8 has been removed, logging operations can be conducted using a wireline logging tool 34, i.e., a sensing instrument sonde suspended by a cable 42 having conductors for transporting power to the tool and telemetry from the tool to the surface. A dielectric logging portion of the logging tool 34 may have sensing pads 36, having one or more electromagnetic sensors positioned thereon, that slide along the borehole wall as the tool is pulled uphole. A logging facility 44 collects measurements from logging tool 34, and includes computing facilities for processing and storing the measurements gathered by logging tool 34.

Figure 3:
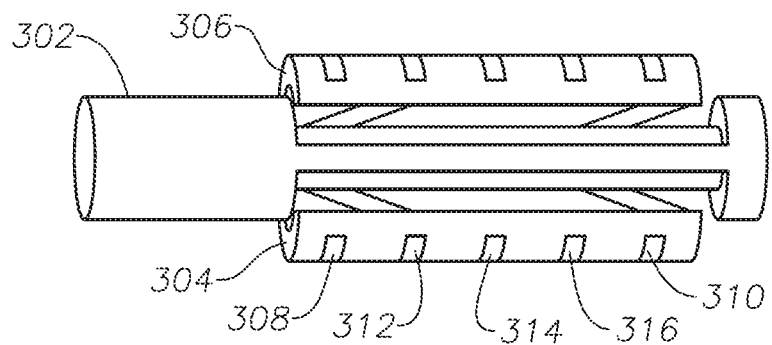
FIG. 3 shows a sensor arrangement for a wireline dielectric logging tool, according to certain illustrative embodiments of the present disclosure.

FIG. 3 shows a sensor arrangement for a wireline dielectric logging tool 302, according to certain illustrative embodiments of the present disclosure. Dielectric logging tool 302 includes one or more pads 304, 306 that extend from the tool body to contact the borehole wall. One or more of these pads places an arrangement of electromagnetic sensors in close proximity to the wall. The sensor arrangement shown in FIG. 3 includes a pair of axially-spaced transmitting sensors 308, 310 and three receiving sensors 312, 314 and 316 axially spaced between the transmitters. In an alternative wireline tool embodiment (not shown), the sensor arrangement is embedded in the tool surface, and an arm extends from the opposite side of the tool body to hold the sensor arrangement in close proximity to the borehole wall. Wireline tools may also use the directional information sensors to orient images.

Figure 4:
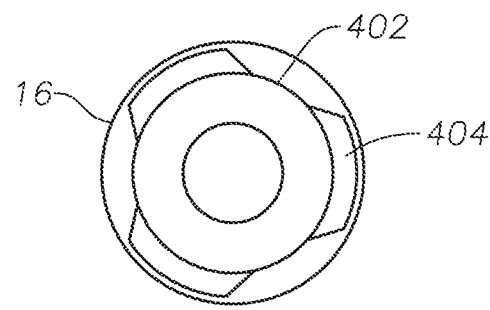
FIG. 4 shows an LWD dielectric logging tool of the present disclosure deployed along a borehole.

FIG. 4 shows an LWD dielectric logging tool 402 disposed in a borehole 16. Tool 402 includes two or more stabilizers 404 that maintain the tool near the center of borehole 16 and, in so doing, minimize the standoff between the wall-contacting surfaces of the stabilizers and the borehole wall. It is desirable to minimize the thickness of the fluid layer between the sensing surface and the portions of the wall being measured. Other mechanisms can be employed to minimize standoff in the LWD dielectric tool, including pads mounted on extendable arms or biasing springs. Alternatively, such arms or springs may be used to force the tool body itself against the borehole wall. Though suitable for this application, such mechanisms may not be as robust as a sensing surface embedded in a stabilizer.

Figure 5:
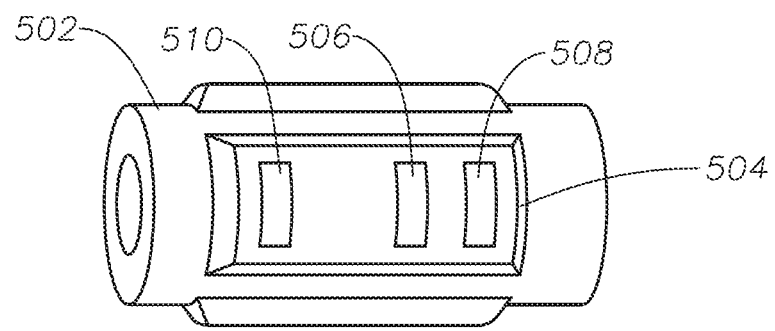
FIG. 5 shows a side-view of a LWD dielectric tool, having one or more stabilizers, along with an illustrative electromagnetic sensor arrangement.

FIG. 5 shows a side-view of the LWD dielectric tool 502, having one or more stabilizers 504, along with an illustrative electromagnetic sensor arrangement. The three-antenna arrangement of FIG. 5 includes a single transmitter sensor/antenna 506 between two receiver sensors/antennas 508, 510 which are spaced at different distances from the transmitter sensor. The asymmetric receiver spacing offers four independent phase and amplitude measurements, which may not be sufficient when it is desired to compensate for variations in standoff distance.

Those ordinarily skilled in the art realize the foregoing dielectric tool designs are illustrative in nature, and that the electromagnetic sensors described herein may be utilized in a variety of such designs.

Nevertheless, as the foregoing LWD dielectric tools rotate and progresses downhole at the drilling rate, each sensing surface will trace a helical path on the borehole wall. Orientation sensors within the tool can be used to associate the measurements with the sensors' positions on the borehole wall. Electronics within the tool can aggregate measurements versus position to form a detailed map of the borehole wall, which can be stored for later retrieval or compressed and transmitted to the surface for timely use by the drilling team. If sufficient telemetry bandwidth is available, surface computing facilities can collect formation property measurements, orientation (azimuth) measurements, and tool position measurements, and process the collected measurements to create and display the map.

Figure 6A:
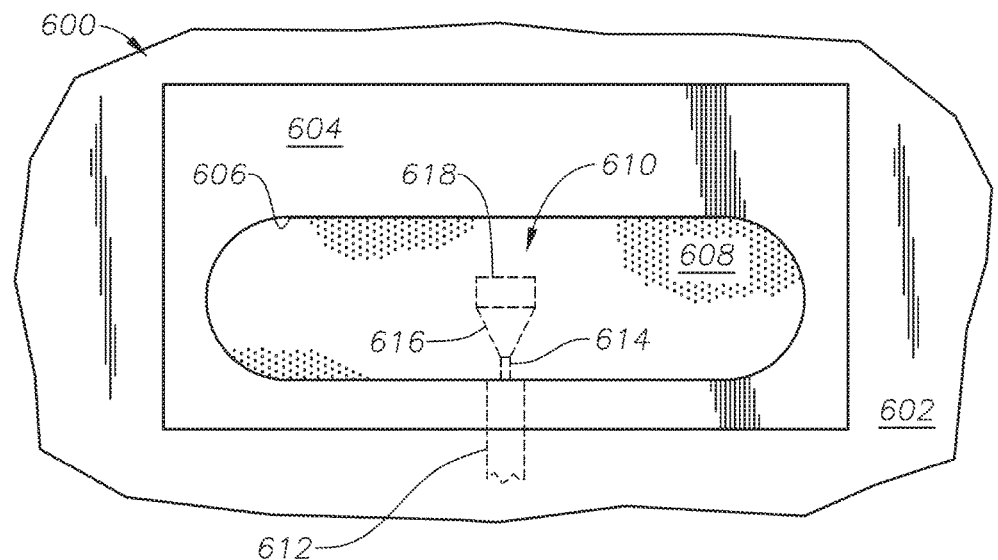
FIGS. 6A and 6B are a top-side and side sectional view of an electromagnetic sensor positioned along a dielectric tool, respectively, according to certain illustrative embodiments of the present disclosure.
Figure 6B:
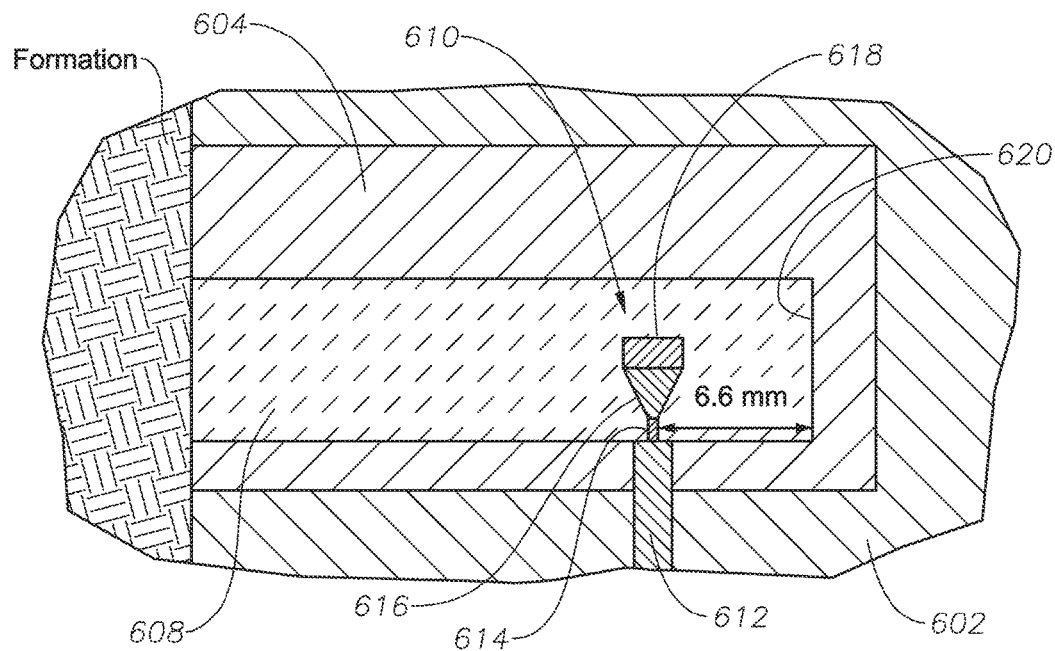

Now that an illustrative dielectric tool has been described, a detailed description of the electromagnetic sensors will be provided. FIGS. 6A and 6B are a top-side and side sectional view of an electromagnetic sensor positioned along a dielectric tool, respectively, according to certain illustrative embodiments of the present disclosure. Electromagnetic sensor 600 is positioned along the body of a dielectric tool 602, as previously described herein. Electromagnetic sensor 600 includes a conductive pad 604, which may be, for example, metal, super conductor material, graphite, or conductive polymers. A cavity 606 is positioned within conductive pad 604 in which a dielectric filler 608 is present. Dielectric filler 608 may be any dielectric material such as, for example, a ceramic material or polymer dielectric material having a proper dielectric constant. In certain embodiments, the dielectric constant ($\Sigma_r$) may be chosen such that the operating frequency is higher than the cut-off frequency of the desired mode. For example, if the desired mode is $TE_{mn}$, then the value of dielectric constant must satisfy the requirement that:

$$f_{operating} > \frac{1}{2\pi\sqrt{\mu\epsilon_0\epsilon_r}}\sqrt{\left(\frac{m\pi}{a}\right)^2 + \left(\frac{n\pi}{b}\right)^2}, \quad \text{Eq.(1)}$$

where $\mu$ is permeability of filler, $\epsilon_0$ is the free space permittivity, a and b are the width and height of the opening of the cavity 606.

A conductive feeder 610 is positioned inside dielectric filler 608. An electrical conductor 612 is coupled to dielectric filler 608 and conductive feeder 610 to provide electrical current to conductive feeder 610. In this illustrative embodiment, electrical conductor 612 is a coaxial cable having an outer conductor (not shown) and an inner conductor 614. The outer conductor (grounded) is connected to the edge of cavity 606 as shown, while inner conductor 614 is connected to conductive feeder 610 to provide current. Conductive feeder 610 includes a frustum 616 having a two ends. One of the ends of frustum 616 is connected to inner conductor 614, while the opposite end is connected to a loading cylinder 618. In this embodiment, frustum 616 and loading cylinder 618 are solid metallic pieces, both being circular in shape. However, in other embodiments, they may take on other shapes.

Figure 7:
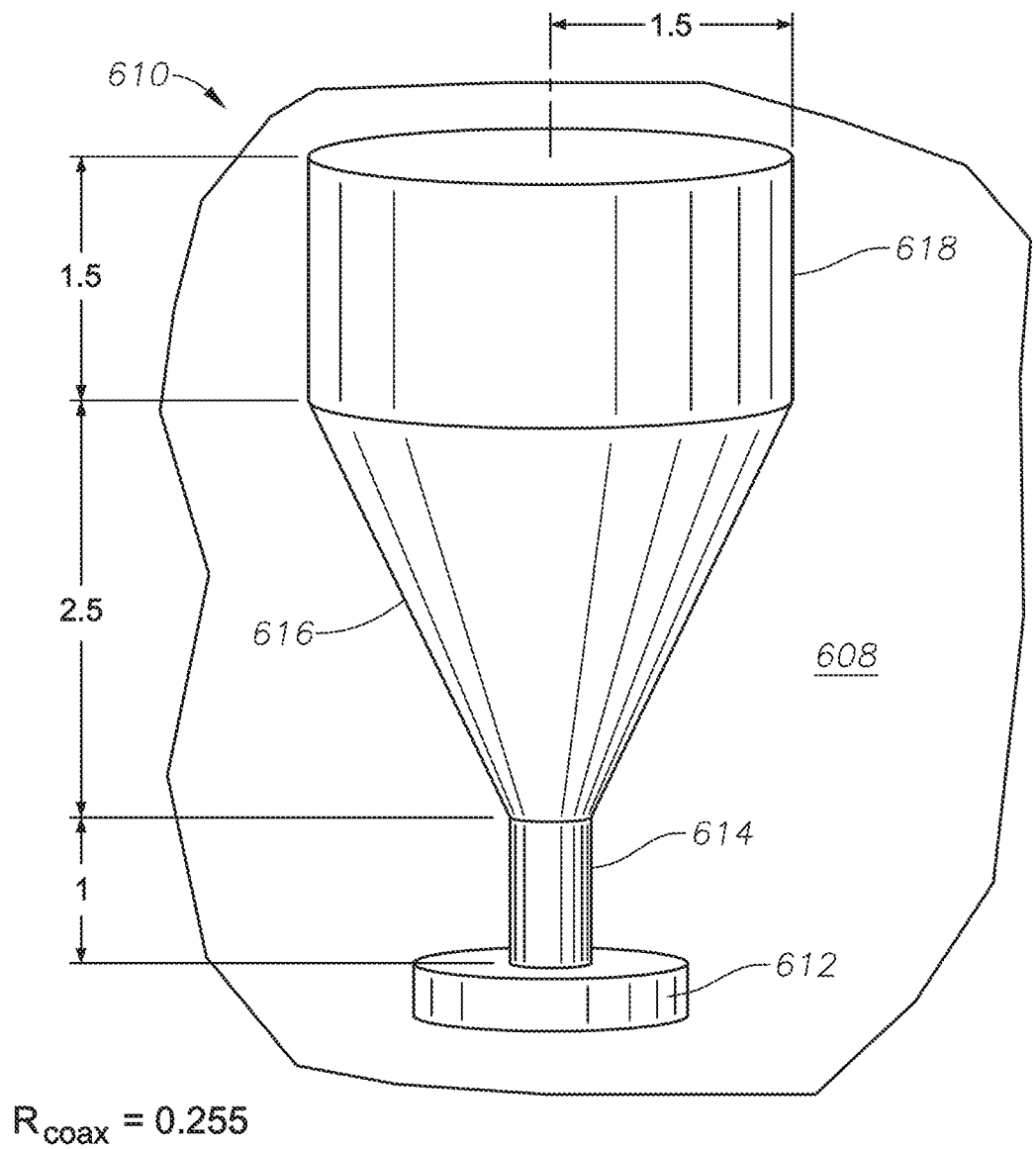
FIG. 7 is an exploded view of a conductive feeder having certain dimensions, according to certain illustrative embodiments of the present disclosure.

As will be described in more detail below, the shape and dimensions of conductive feeder 610 are selected in order to optimize the sensors performance over the entire range of the dielectric constant. FIG. 7 is an exploded view of an example conductive feeder having certain dimensions, according to certain illustrative embodiments of the present disclosure. In this example, the operating frequency of the downhole dielectric tool is 1 Gigahertz (GHz), and the dimension of cavity 606 is chosen such that the cavity resonates at 1 GHz. Inner conductor 614 has a radius $R_{coax}$ of 0.255 millimeters (mm), a length of 1 mm (from the wall of cavity 606), and extends into dielectric filler 608 approximately 6.6 mm from base 620 of cavity 606. Frustum 616 comprises a length of 2.5 mm, and loading cylinder 618 has a radius of 1.5 mm and a length of 1.5 mm.

Note that the dimensions shown in FIG. 7 are illustrative in nature. The following method may be used to determine the dimensions in other embodiments. The operating frequency of the downhole dielectric tool is within the microwave frequency band (for example, 1 Gigahertz (GHz)). Thus, the dimension of cavity 606 and dielectric filler 608 are chosen such that the operating frequency is higher than the cut-off frequency of the desired eigenmode (for example, $TE_{10}$ mode) as shown in Equation 1 above. Feeder 610 consists of an inner conductor 614, a frustum 616, and a loading cylinder 618. Inner conductor 614 (an extension of the core of the feeding coaxial cable, for example, UFF092D Cable) has a radius $R_{coax}$ (which is the same as the core of the feeding coaxial cable), a length $l_{coax}$ (from the wall of cavity 606), and extends into dielectric filler 608, and is located at distance d from base 620 of cavity 606. Frustum 616 comprises a length of $h_2$, and loading cylinder 618 has a radius of r and a length of $h_1$. The dimensions of an inner conductor 614, a frustum 616, and a loading cylinder 618 must be determined to maximize the coupling, by following a procedure to be described below. The optimum dimensions depend on the dimensions of the cavity, dielectric filler, desired eigenmode, and the operating frequency.

With reference to FIGS. 6A, 6B and 7, during operation, sensor 600 is place into contact with formation 622 and current is supplied to conductive feeder 610 via inner conductor 614. Since loading cylinder 618 does not touch conductive pad 604, no current loop (or the associated magnetic dipole) is produced. Instead, the current supplied to conductive feeder 610 produces an electric monopole which feeds electromagnetic power into cavity 606. The resulting electromagnetic signal then radiates out from dielectric filler 608 and into formation 622, whereby another sensor 600 receives the electromagnetic signal (FIG. 6B). Because of the shape and design of conductive feeder 610, there is high coupling gain and SNR between the sensors over the whole range of the dielectric constant, thus greatly improving the performance of the dielectric tool when analyzing varied formation characteristics.

To determine the dimensions of conductive feeder 610 in one illustrative embodiment, the sensor is modeled using a suitable electromagnetic simulation software, such as, for example, HFSS or CST Microwave Studio™. The scattering parameter from transmitter to receiver is a function of formation characteristic and sensor dimensions: $S_{21}(r, h_1, h_2, d, \epsilon_{form})$ where $l_{coax}$ is the length of inner conductor 614, r is the radius of the loading cylinder; $h_1$ is height of the loading cylinder; $h_2$ is height of the frustum; d is the distance between the back wall of cavity (base 620) and the coaxial cable; and $\epsilon_{form}$ is the formation dielectric constant. Now, given the formation dielectric constant, and by setting the dimension parameters, the simulation software calculates the scattering parameter $S_{21}$.

Next, an objective function is defined to evaluate the overall performance of sensors under various formation characteristics. The objective function can be a weighted sum of the magnitudes of scattering parameters for various formation characteristics, such as, for example:

$$f(l_{coax}, r, h_1, h_2, d) = \sum_{i=1}^{N} w_i |S_{21}(l_{coax}, r, h_1, h_2, d, \epsilon_{form}^i)|, \quad \text{Eq(2)}$$

where $w_i$ is the weight assigned to the condition of the formation dielectric constant being $\epsilon_{form}^i$; $w_i \geq 0$; $\Sigma_i w_i = \epsilon_{form}^i \in (5,80)$; and N is the number of formation dielectric constant values to be considered. One example is:

$$f(l_{coax}, r, h_1, h_2, d) = \frac{1}{5}|S_{21}(l_{coax}, r, h_1, h_2, d)_{\epsilon_{form}=5}| \quad \text{Eq(3)}$$
$$+ \frac{1}{5}|S_{21}(l_{coax}, r, h_1, h_2, d)_{\epsilon_{form}=20}|$$

-continued $$+\frac{1}{5}|S_{21}(l_{coax}, r, h_1, h_2, d)_{\epsilon_{form}=40}|$$

$$+\frac{1}{5}|S_{21}(l_{coax}, r, h_1, h_2, d)_{\epsilon_{form}=60}|$$

$$+\frac{1}{5}|S_{21}(l_{coax}, r, h_1, h_2, d)_{\epsilon_{form}=80}|.$$

The objective function can also be the minimum of the magnitudes of scattering parameters for various formation characteristics, such as:

$$f(l_{coax},r,h_1,h_2,d)=\min_{i=1}^{N}\{|S_{21}(l_{coax},r,h_1,h_2,d,\epsilon_{form}^i)|\} \qquad \text{Eq(4)}.$$

For example, $$f(l_{coax}, r, h_1, h_2, d) = \min\left\{\begin{array}{l}|S_{21}(l_{coax}, r, h_1, h_2, d)_{\epsilon_{form}=5}|, |S_{21}(l_{coax}, r, h_1, h_2, d)_{\epsilon_{form}=20}|, \\ |S_{21}(l_{coax}, r, h_1, h_2, d)_{\epsilon_{form}=40}|, |S_{21}(l_{coax}, r, h_1, h_2, d)_{\epsilon_{form}=60}|, \\ |S_{21}(l_{coax}, r, h_1, h_2, d)_{\epsilon_{form}=80}|\end{array}\right\}. \qquad \text{Eq(5)}$$

Thereafter, numerical optimizations are conducted to thereby determine the optimal dimensions that correspond to the maximum value of the objective function. The dimensions may then be analyzed and modified in consideration of fabrication tolerances and other practical factors. Thereafter, the dimensions are finalized.

Unlike conventional dielectric tools that utilize a magnetic dipole, the illustrative embodiments of the present disclosure utilize an electric monopole to feed the electromagnetic power into the dielectric cavity. During testing of embodiments of the present disclosure, a comparison of performance was conducted based on a computer simulation. The simulation is designed as follows: (1) two conventional electromagnetic sensors were pressed against a formation, and the coupling gain ($S_{21}$) from the transmitter to receiver was calculated. This was repeated for the sensors of the present disclosure; (2) the spacing between the two sensors was selected as the real distance between the upper receiver and upper transmitter of the dielectric tool; (3) the simulation frequency was 1 GHz; and (4) since dielectric tools are most often used for evaluating highly resistive formations, the conductivity of formation was chosen to be 0.01 Siemens per meter (S/m).

Figures 8, 9:
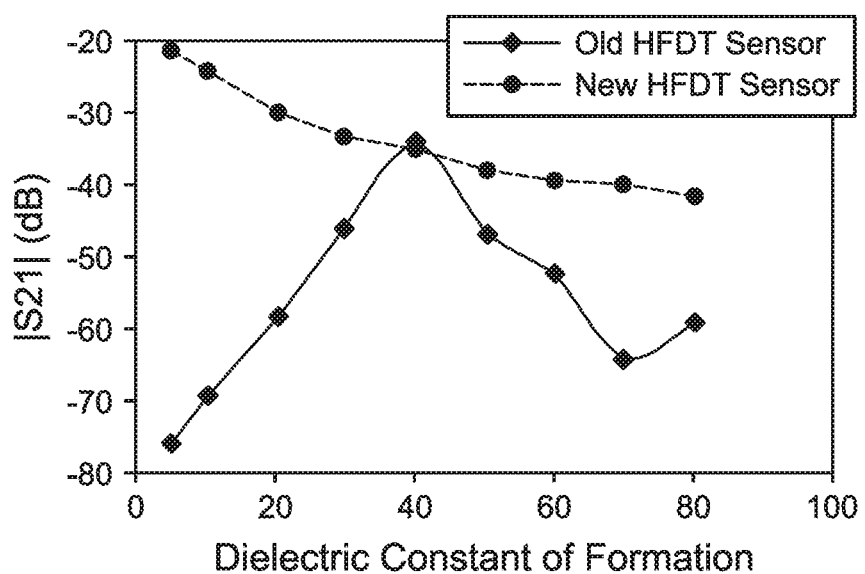
FIG. 8 is a table that lists a variety of formation materials along with their relative dielectric permittivity and propagation times.
FIG. 9 shows simulation results that plot the coupling gain versus the dielectric constant of the formation for conventional sensors and the sensors of the present disclosure.

The range of dielectric constant from 5 to 80 was then investigated, as this range covers the dielectric constant of most material in the formation. FIG. 8 is a table that lists a variety of formation materials along with their relative dielectric permittivity, $\epsilon'$, and propagation times, $t_{pl}$. The simulation results are shown in FIG. 9, which plots the coupling gain ($S_{21}$) versus the dielectric constant of the formation for the conventional sensors and the sensors of the present disclosure. As can be seen, the conventional sensor performs satisfactorily only over a small range of dielectric constant (around 40). Once the dielectric constant is out of this range, the coupling decreases remarkably. The coupling especially drops to −76 dB for a formation dielectric constant of 5, and to −64 dB for a formation dielectric constant of 70. The instability of performance with respect to the variation of formation characteristic will certainly limit the quality and accuracy of well logging results acquired using the conventional sensor design.

Still referring to FIG. 9, sensors of the present disclosure, however, exhibit very good coupling gain, and thus SNR, over the whole range of the dielectric constant (5 to 80). For the low dielectric constant case ($\epsilon_r=5$), where the conventional sensor performs worst, a huge improvement of 50 dB is made by the presently disclosed sensors. For the medium dielectric constant case ($\epsilon_r=40$), where the conventional sensors perform best, the present disclosed sensors show comparable performance. For the high dielectric constant case ($\epsilon_r=70$~80), a very large improvement of approximately 20 dB is observed.

Accordingly, the illustrative electromagnetic sensors described herein perform well (both high coupling gain and SNR) over the whole range of the dielectric constant. In addition, the sensors are power-efficient as a result of the improved efficiency in power utilization. Moreover, through use of the disclosed sensors, the accuracy of well logging results will be remarkably improved for a wide range of formation dielectric constants, due to higher coupling gain and higher Signal-Noise-Ratio (SNR).

Embodiments and methods described herein further relate to any one or more of the following paragraphs:

1. An electromagnetic sensor for a downhole logging tool, comprising a conductive pad having a cavity therein; dielectric filler positioned within the cavity; an electrical conductor coupled to the dielectric filler; and a conductive feeder positioned inside the dielectric filler, the conductive feeder being coupled to the electrical conductor.

2. An electromagnetic sensor as defined in paragraph 1, wherein the electrical conductor is a coaxial cable comprising an outer conductor and an inner conductor; the outer conductor extends up to an edge of the cavity; and the inner conductor extends into the cavity and dielectric filler, whereby the inner conductor is coupled to the conductive feeder.

3. An electromagnetic sensor as defined in paragraphs 1 or 2, wherein the conductive feeder comprises a frustum having a first end and a second end opposite the first end, the first end being coupled to the inner conductor; and a loading cylinder coupled to the second end of the frustum.

4. An electromagnetic sensor as defined in any of paragraphs 1-3, wherein a dimension of the cavity is configured to resonate at an operating frequency of the logging tool.

5. An electromagnetic sensor as defined in any of paragraphs 1-4, wherein dimensions of the cavity and dielectric filler are configured such that an operating frequency of the logging tool is higher than a cut-off frequency of an eigenmode of the logging tool.

6. An electromagnetic sensor as defined in any of paragraphs 1-5, wherein the electromagnetic sensor forms part of a downhole logging tool having at least two of the electromagnetic sensors; and dimensions of the inner conductor, frustum and loading cylinder are configured to maximize coupling between the electromagnetic sensors.

7. An electromagnetic sensor as defined in any of paragraphs 1-6, wherein an operating frequency of the downhole tool is approximately 1 Gigahertz; the inner conductor comprises: a radius of 0.255 millimeter ("mm"); and a length of 1 mm; the frustum comprises a length of 2.5 mm; and the loading cylinder comprises: a radius of 1.5 mm; and a length of 1.5 mm.

8. An electromagnetic sensor as defined in any of paragraphs 1-7, wherein the dielectric filler has a dielectric constant satisfying a criteria defined by f_operating>1/(2π√(µ∈_0∈_r))√((mπ/a)^2+(nπ/b)^2).

9. An electromagnetic sensor as defined in any of paragraphs 1-8, wherein the conductive feeder is an electric monopole.

10. An electromagnetic sensor as defined in any of paragraphs 1-9, wherein the conductive feeder does not contact the conductive pad.

11. An electromagnetic sensor as defined in any of paragraphs 1-10, wherein the conductive feeder and the conductive pad are metal.

12. An electromagnetic sensor as defined in any of paragraphs 1-11, wherein the electromagnetic sensor forms part of a high frequency dielectric logging tool having two or more of the electromagnetic sensors.

13. An electromagnetic sensor as defined in any of paragraphs 1-12, wherein the logging tool is positioned along a wireline or drilling assembly.

14. An electromagnetic sensor for a downhole logging tool, comprising a conductive pad having a cavity therein; dielectric filler positioned within the cavity; and an electric monopole feeder positioned inside the dielectric filler.

15. An electromagnetic sensor as defined in paragraph 14, wherein the electric monopole feeder comprises a frustum having a first end and a second end opposite the first end, the first end being coupled to a current source; and a loading cylinder coupled to the second end of the frustum.

16. An electromagnetic sensor as defined in paragraphs 14 or 15, wherein the current source is a coaxial cable comprising an outer conductor and an inner conductor; the outer conductor extends up to an edge of the cavity; and the inner conductor extends into the cavity and dielectric filler, whereby the inner conductor is coupled to the electric dipole feeder.

17. An electromagnetic sensor as defined in any of paragraphs 14-16, wherein the electromagnetic sensor forms part of a logging tool having two or more of the electromagnetic sensors.

18. An electromagnetic sensor as defined in any of paragraphs 14-17, wherein the logging tool is positioned along a wireline or drilling assembly.

19. A logging method, comprising deploying a logging tool into a borehole extending along a formation, the logging tool having two or more electromagnetic sensors comprising: a conductive pad having a cavity therein; dielectric filler positioned within the cavity; an electrical conductor coupled to the dielectric filler; and a conductive feeder positioned inside the dielectric filler, the conductive feeder being coupled to the electrical conductor; emitting an electromagnetic signal into the formation; receiving the signal using at least one of the electromagnetic sensors; and determining at least one characteristic of the formation using the signal.

20. A logging method as defined in paragraph 19, wherein the electromagnetic sensors operate in contact with a wall of the borehole.

21. A logging method as defined in paragraph 19 or 20, wherein the logging tool is deployed along a wireline or drilling assembly.

Although various embodiments and methodologies have been shown and described, the disclosure is not limited to such embodiments and methodologies and will be understood to include all modifications and variations as would be apparent to one skilled in the art. Therefore, it should be understood that embodiments of the disclosure are not intended to be limited to the particular forms disclosed. Rather, the intention is to cover all modifications, equivalents and alternatives falling within the spirit and scope of the disclosure as defined by the appended is claims.

What is claimed is:

1. An electromagnetic sensor for a downhole logging tool, comprising:
   a conductive pad having a cavity therein;
   dielectric filler positioned within the cavity;
   an electrical conductor coupled to the dielectric filler; and
   a conductive feeder positioned inside the dielectric filler, the conductive feeder being coupled to the electrical conductor and further comprising:
   a frustum having a first end and a second end opposite the first end, the first end being coupled to a conductor; and
   a loading cylinder coupled to the second end of the frustum.

2. An electromagnetic sensor as defined in claim 1, wherein:
   the electrical conductor is a coaxial cable comprising an outer conductor and an inner conductor;
   the outer conductor extends up to an edge of the cavity; and
   the inner conductor extends into the cavity and dielectric filler, whereby the inner conductor is coupled to the conductive feeder.

3. An electromagnetic sensor as defined in claim 2, wherein a dimension of the cavity is configured to resonate at an operating frequency of the logging tool.

4. An electromagnetic sensor as defined in claim 2, wherein dimensions of the cavity and dielectric filler are configured such that an operating frequency of the logging tool is higher than a cut-off frequency of an eigenmode of the logging tool.

5. An electromagnetic sensor as defined in claim 2, wherein:
   the electromagnetic sensor forms part of a downhole logging tool having at least two of the electromagnetic sensors; and
   dimensions of the inner conductor, frustum and loading cylinder are configured to maximize coupling between the electromagnetic sensors.

6. An electromagnetic sensor as defined in claim 2, wherein:
   an operating frequency of the downhole tool is approximately 1 Gigahertz;
   the inner conductor comprises:
   a radius of 0.255 millimeter ("mm"); and
   a length of 1 mm;
   the frustum comprises a length of 2.5 mm; and
   the loading cylinder comprises:
   a radius of 1.5 mm; and
   a length of 1.5 mm.

7. An electromagnetic sensor as defined in claim 1, wherein the dielectric filler has a dielectric constant satisfying a criteria defined by:

$$f_{operating} > \frac{1}{2\pi\sqrt{\mu\epsilon_0\epsilon_r}}\sqrt{\left(\frac{m\pi}{a}\right)^2 + \left(\frac{n\pi}{b}\right)^2}$$

8. An electromagnetic sensor as defined in claim 1, wherein the conductive feeder is an electric monopole.

9. An electromagnetic sensor as defined in claim 1, wherein the conductive feeder does not contact the conductive pad.

10. An electromagnetic sensor as defined in claim 1, wherein the conductive feeder and the conductive pad are metal.

11. An electromagnetic sensor as defined in claim 1, wherein the electromagnetic sensor forms part of a high frequency dielectric logging tool having two or more of the electromagnetic sensors.

12. An electromagnetic sensor as defined in claim 10, wherein the logging tool is positioned along a wireline or drilling assembly.

13. An electromagnetic sensor for a downhole logging tool, comprising:
   a conductive pad having a cavity therein;
   dielectric filler positioned within the cavity; and
   an electric monopole feeder positioned inside the dielectric filler, the electric monopole feeder comprising:
      a frustum having a first end and a second end opposite the first end, the first end being coupled to a current source; and
      a loading cylinder coupled to the second end of the frustum.

14. An electromagnetic sensor as defined in claim 13, wherein:
   the current source is a coaxial cable comprising an outer conductor and an inner conductor;
   the outer conductor extends up to an edge of the cavity; and
   the inner conductor extends into the cavity and dielectric filler, whereby the inner conductor is coupled to the electric dipole feeder.

15. An electromagnetic sensor as defined in claim 13, wherein the electromagnetic sensor forms part of a logging tool having two or more of the electromagnetic sensors.

16. An electromagnetic sensor as defined in claim 15, wherein the logging tool is positioned along a wireline or drilling assembly.

17. A logging method, comprising:
   deploying a logging tool into a borehole extending along a formation, the logging tool having two or more electromagnetic sensors comprising:
      a conductive pad having a cavity therein;
      dielectric filler positioned within the cavity;
      an electrical conductor coupled to the dielectric filler; and
      a conductive feeder positioned inside the dielectric filler, the conductive feeder being coupled to the electrical conductor and further comprising:
         a frustum having a first end and a second end opposite the first end, the first end being coupled to a conductor; and
         a loading cylinder coupled to the second end of the frustum;
   emitting an electromagnetic signal into the formation;
   receiving the signal using at least one of the electromagnetic sensors; and
   determining at least one characteristic of the formation using the signal.

18. A logging method as defined in claim 17, wherein the electromagnetic sensors operate in contact with a wall of the borehole.

19. A logging method as defined in claim 17, wherein the logging tool is deployed along a wireline or drilling assembly.

* * * * *